United States Patent [11] 3,584,155

[72] Inventor Frederick H. Koster
New Hyde Park, N.Y.
[21] Appl. No. 817,017
[22] Filed Apr. 17, 1969
[45] Patented June 8, 1971
[73] Assignee American Telephone and Telegraph Company
New York, N.Y.

[54] SWITCHING SYSTEM WITH REMOTELY CONTROLLABLE CLASS OF SERVICE
13 Claims, 8 Drawing Figs.

[52] U.S. Cl. .......... 179/18
[51] Int. Cl. .......... H04m 3/38
[50] Field of Search .......... 179/27.11, 18.19

[56] References Cited

UNITED STATES PATENTS 3,440,355 4/1969 Schildgen et al. .......... 179/27 (.11)
3,328,535 6/1967 Sikorski .......... 179/18 (.19)

*Primary Examiner*—Kathleen H. Claffy
*Assistant Examiner*—Thomas W. Brown
*Attorneys*—N. S. Ewing and James Warren Falk

ABSTRACT: A switching system is arranged to provide selectively changeable class of service treatments on each station served from the system. Auxiliary circuits, individually associated with the switching system line appearance of each station, are arranged with magnetic latching relays for controlling the class of service cross-connect patch field associated therewith in accordance with data transmitted to the auxiliary circuit from an attendant console. The auxiliary circuit of a selected station responds to interrogation signals from the console by transmitting to the console signals representing the class of service currently effective on that station.

FIG. I

INVENTOR
F. H. KOSTER
BY David Wannenbaum
ATTORNEY

SWITCHING SYSTEM WITH REMOTELY CONTROLLABLE CLASS OF SERVICE

BACKGROUND OF THE INVENTION

This invention relates generally to telephone-switching systems and more particularly to arrangements within such systems wherein the class of service treatment of any station is selectively changeable.

DESCRIPTION OF THE PRIOR ART

Electronic communication has become a vital factor in today's highly mobile society. In this regard, the telephone is an important instrument in the transaction of everyday business and social activities. In order to increase the efficiency with which people communicate with each other, automatic switching systems have been designed to eliminate the inherently slow manual establishment of telephone connections. This automatic switching concept has been extended to private branch exchange (PBX) systems, where it is now possible to establish a connection, without operator assistance, to any PBX station by dialing the individual directory number associated with the desired station. Consequently, attendants are no longer in control of originating or terminating connections involving such PBX stations.

It has been found that in many situations, however, special restrictions are necessary on individual telephone stations. These restrictions or class of service treatments are usually temporary in nature and include such requirements as the prevention of outgoing long distance calls or the limitation of outgoing calls to certain hours. Since attendants no longer are involved in the establishment of calls involving automated PBX stations, the service class must be provided automatically by the switching network. In conjunction with the provision of these restrictions, there is an ever increasing demand for features which render the class of service treatment of a particular line easily changeable.

A specific example of the desirability of such flexible restriction arrangements is in a switching system wherein the personnel assigned to each station are continuously changing, such as is typical in a hospital PBX system. In such an environment, the class of service provided to each telephone station generally will change with each patient assigned to that station. For obvious reasons, certain patients may not be allowed to receive calls but may be permitted to originate them. Some patients may be permitted to place long distance calls while other patients are restricted to local dialing. It is necessary therefore that individual restrictions be established on each telephone immediately upon assignment of that instrument to a patient.

Automatic common controlled switching systems have been designed which provide individual class of service treatment on each subscriber station. In the typical situation, the switching network is arranged to complete calls to and from a line in accordance with the class of service associated with that line. This class of service information is provided to the switching network via a prewired cross-connect field associated with that line, or with a group of such lines. Such restrictions are therefore semipermanent in nature and require the services of maintenance personnel to make the necessary wiring changes whenever the class of service of a line is changed.

In copending application Ser. No. 711,981 filed Mar. 11, 1968, by D. J. Morgan, C. C. Nielson and J. G. Whitemyer, now U.S. Pat. No. 3,490,055, there is disclosed a memory-controlled common control switching system wherein the subscriber at certain stations served by the switching system may change the class of service treatment afforded that station. However, in situations such as hospitals and hotels, for obvious reasons, the class of service on each station must be controlled exclusively by a PBX attendant and not by the person assigned to the station.

In addition, the Morgan disclosure primarily is directed to situations where only a relatively limited number of stations require service changes at any given time. Thus, the additional memory that would be required if the Morgan concept were applied to the PBX situation would make variable class of service treatments on individual lines uneconomical. Accordingly, the Morgan disclosure, while providing a solution to the problem of providing variable class of service treatments for private subscribers, provides neither for the situation where the class of service of a station must be changed by a person other than the party assigned to that station, nor for the situation where it is necessary to control the class of service restrictions on a large number of stations.

In view of the foregoing, an object of this invention is to provide a switching system arrangement which may be simply and economically implemented in existing systems so as to obviate the necessity of manually rewiring the class of service treatment on selected stations served therefrom.

A further object of this invention is to provide a switching arrangement which will permit the class of service associated with each station to be changed under control of a central console.

A still further object of this invention is to provide a PBX switching system in which the call-completion restrictions associated with each station may be controlled by an attendant at a remote location.

SUMMARY OF THE INVENTION

These and other objects are obtained in accordance with an exemplary embodiment of the invention wherein remotely variable class of service features, such as "restricted outward calling" and "outward calling only," are provided to PBX stations served by a common-controlled switching system. An auxiliary circuit is individually associated with the class of service cross-connection field serving each station. The auxiliary circuit is arranged to recognize the transmission of a predetermined signal from an attendant's console and to respond thereto by releasing the current class of service cross-connection and reenabling the cross-connection field in accordance with data received from the console. All originating and terminating connections involving the station are thereafter completed in accordance with the selected class of service cross-connection.

Prior to the establishment of a communication link between a console and an auxiliary circuit, the customer group identification number associated with the console and the number associated with the auxiliary circuit are matched to insure that changes in the class of service treatment on the selected line are made from consoles serving the same customer group. Provision is made also for the interrogation, from a console, of the class of service treatment currently provided on any line in the customer group.

In accordance with one feature of the invention, each subscriber line served by a common control switching system is arranged with an auxiliary circuit responsive to signals received from an attendant console for selectively changing the class of service of that line in accordance with the received signals.

In accordance with another feature of the invention, a centralized PBX telephone switching system is arranged with auxiliary circuits individually associated with each station line responsive to the receipt of signals over the line from a remotely located attendant's console for selectively changing the class of service treatment of that line.

In accordance with still another feature of the invention, a centralized PBX telephone switching system is arranged with auxiliary circuits individually associated with each station line responsive to the receipt of signals over the line from a remotely located attendant's console for transmitting to the console signals representing the class of service currently provided on that line.

It is also a feature of the invention that a switching system is arranged with equipment responsive to information transmitted from an attendant's console to render effective on a selected station a class of service arbitrarily selected by the console to replace a class of service preassigned to that station.

It is still another feature of this invention that a PBX switching system is arranged to permit a PBX attendant to arbitrarily select a class of service on a selected station resulting in a subsequent change in the manner in which originating and terminating calls to that station are processed.

DESCRIPTION OF THE DRAWING

The foregoing objects, features and advantages, as well as others of the invention, will be more apparent from the following description of the drawing, in which.

It will be noted that FIGS. 2 through 6 employ a type of notation referred to as "detached contact" in which an X shown intersecting a conductor represents a normally open contact of a relay and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the Sept. 1955 publication of the *American Institute of the Electrical Engineers Transactions, Communications and Electronics*, Vol. 74, pages 505—513.

Figure 2:
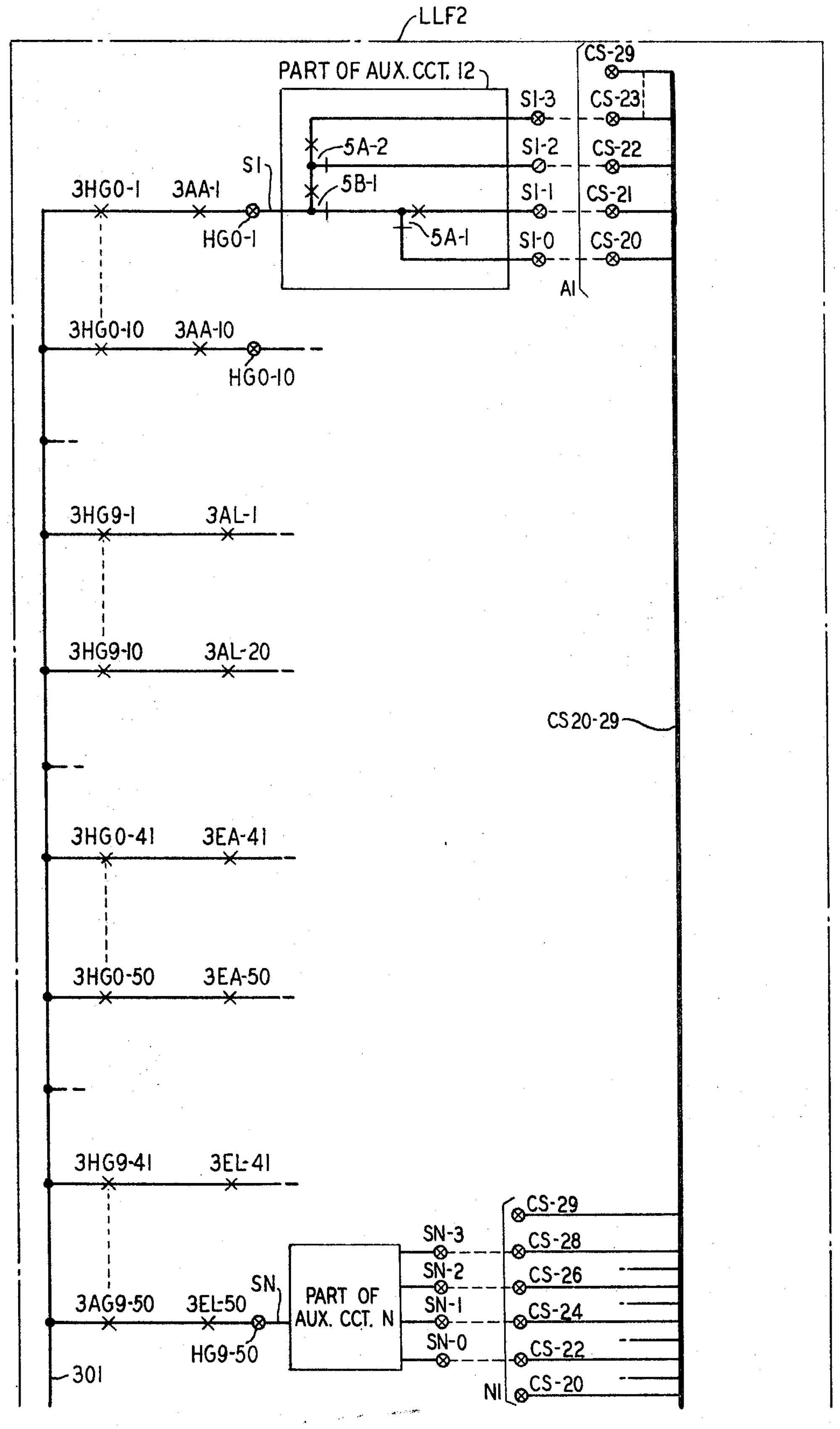
FIGS. 2 through 6 are schematic drawings showing in greater detail the interrelations of the components of the exemplary embodiment.
Figure 3:
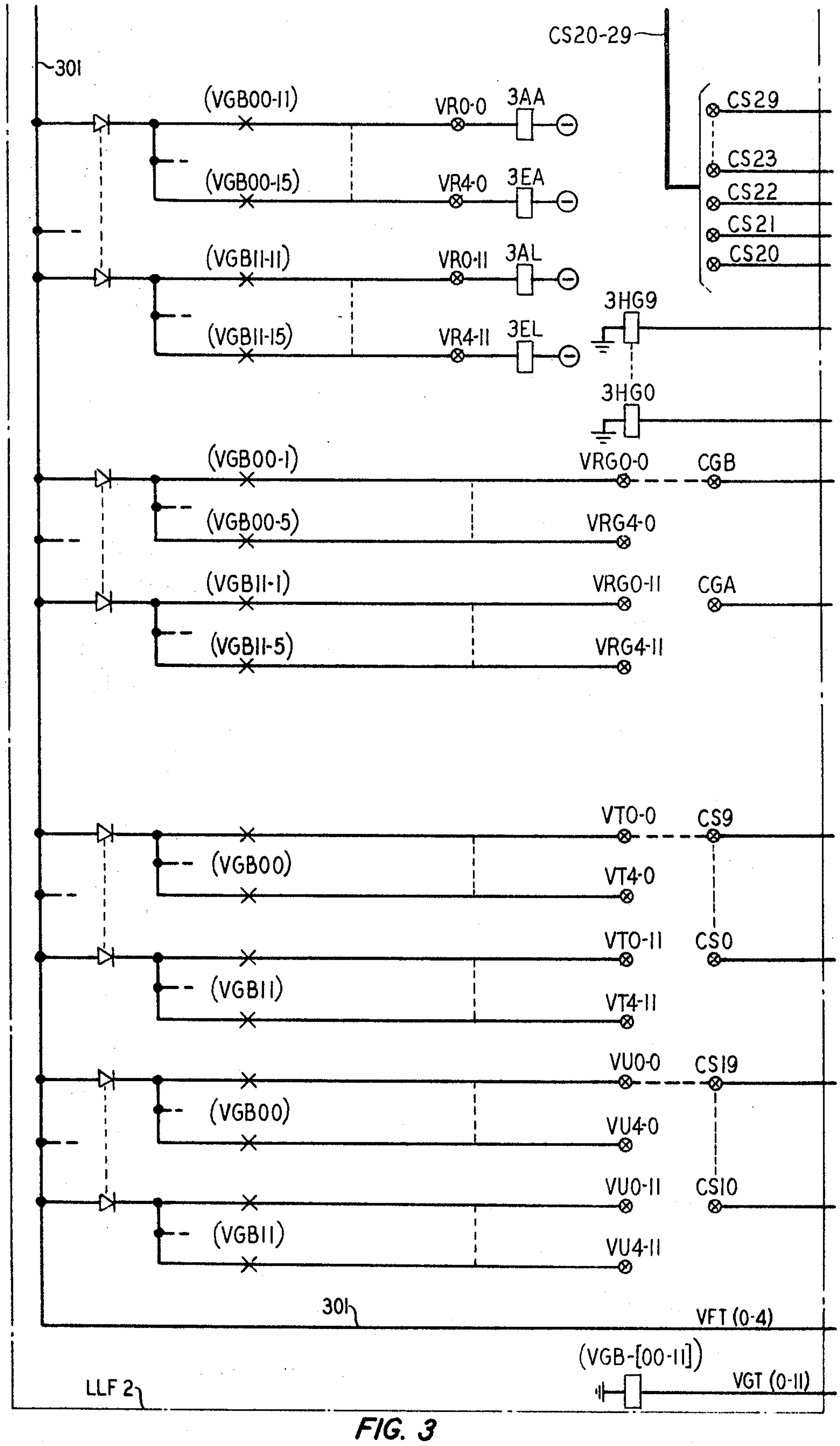

It will be noted also that in order to simplify the disclosure and thus facilitate a more complete understanding of the embodiment, the relays, INTRODUCTION contacts and other electromechanical devices shown in FIGS. 2 through 6 have been given systematic designations. Thus, the number preceding the letters of each device corresponds to the figure in which the control circuit of the device is shown. Thus, the coil of relay 3AA is shown in FIG. 3. Each relay contact, either make, break or transfer, is shown with its specific contact number preceded by the designation of the relay to which it belongs. For example, the notation 3AA–1 indicates contact number 1 of relay 3AA the coil of which is shown in FIG. 3.

INTRODUCTION

The present invention is illustrated in an automatic switching system wherein common control circuits are employed to control the establishment of calls through a switching network. One such system is disclosed in the A. J. Busch U.S. Pat. No. 2,585,904, issued Feb. 19, 1952. It is to be understood that the present invention is not, however, limited to use in a telephone system of this type but may be utilized in other types of switching systems.

The invention is described herein as being embodied in a telephone system of the type disclosed in the cited Busch patent. The invention is particularly concerned with apparatus in consoles Cl–C*n* and auxiliary circuits 12–N. The equipment units of the Busch system are neither shown nor described in detail herein except where necessary for a complete understanding of the invention. The cited Busch patent may be consulted for a complete understanding of the construction and operation of other components of the Busch disclosure.

For purposes of illustration, it is intended that the apparatus of line link frame (LLF) 2, trunk line frame (TLF) 3, outgoing trunk 5, originating register 6, line link frame connector 11, line link marker connector 9, trunk link frame connector 10, incoming trunk 4, and marker 8 be similar to the corresponding apparatus disclosed in the Busch patent. It is also intended that the apparatus shown in busy verification trunk 7 and the manner in which this circuit is employed in the embodiment be substantially identical to that which is set forth in U.S. Pat. No. 3,327,065 issued to G. A. Michalopoulos et al., dated June 20, 1967.

In order to facilitate an understanding of the invention, the description of the operation of the exemplary embodiment has been subdivided into a general description portion designated 1.00 and a detailed description designated 2.00. Section 1.00 and its subsections describe the invention in general terms with respect to FIG. 1 and section 2.00 and its subsections describe the invention in detail with respect to FIGS. 2 through 6.

1.00 GENERAL DESCRIPTION

The interrelation and function of the equipment units of the exemplary embodiment will now be described with respect to FIG. 1, wherein the interconnection of the circuit blocks has been designated by arrows to indicate the direction of circuit action.

Figure 1:
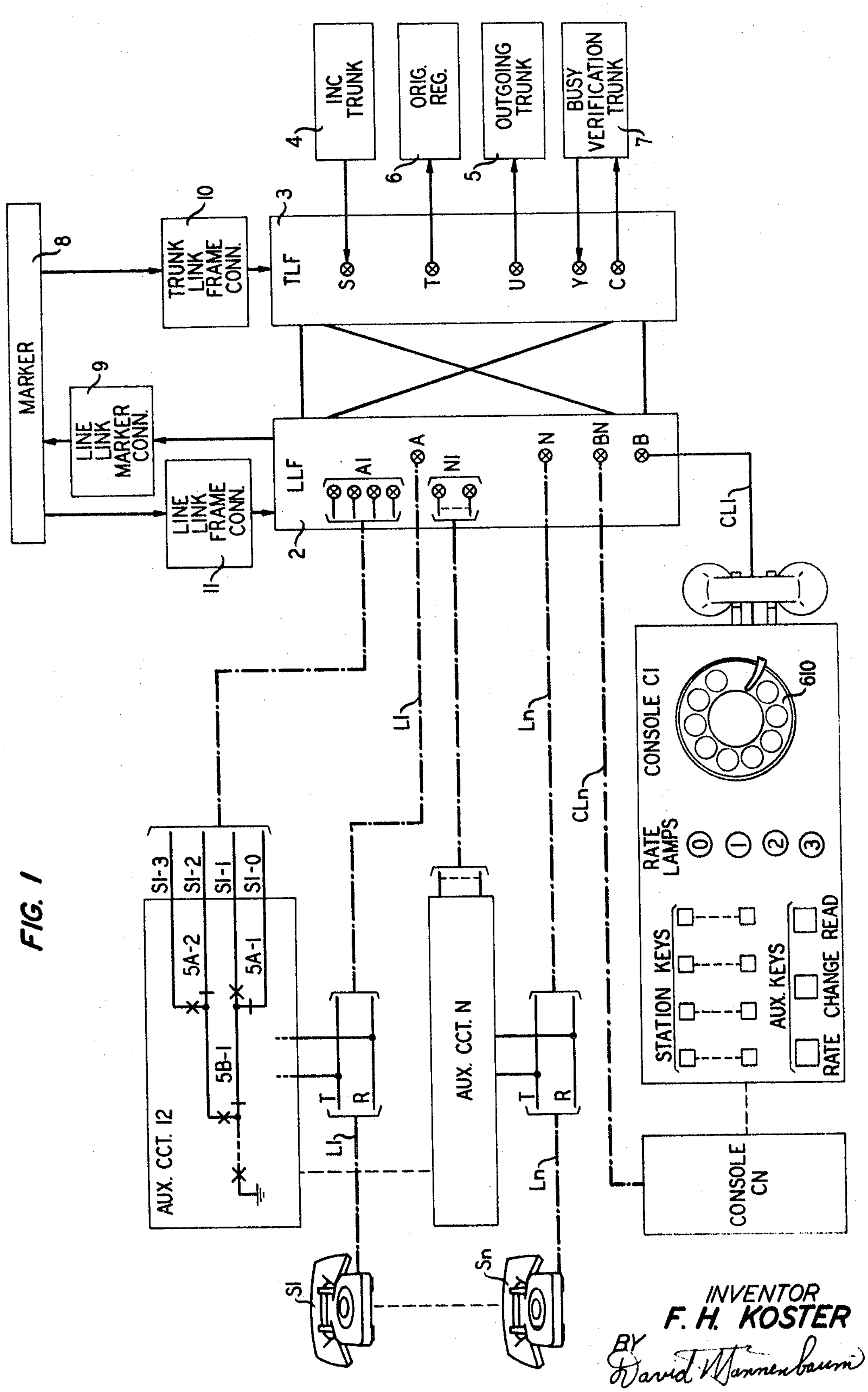
FIG. 1 is essentially a block diagram showing the interrelations of the exemplary embodiment of the invention.

Prior to commencing the general description, it is believed that a more complete understanding of applicant's invention will be facilitated by a brief discussion of certain of the components shown in FIG. 1. As is well known in the art, each subscriber station, such as S1, has a predetermined line appearance, such as appearance A, within the switching system. As discussed hereinbefore, each such station receives a specific preassigned class of service treatment. The class of service information of the station is made available to the common control equipment (i.e., marker 8) in coded form and thereafter controls and determines the particular manner in which calling (originating and terminating) connections involving that station are processed.

As set forth earlier, it is intended that the following text will disclose the manner in which an attendant at one of the consoles C1 to C*n* is permitted to vary the class of service of station S1 by selecting an arbitrary class of service required for an arbitrary interval of time. In order to simplify the description of the illustrative embodiment, only one such class of service change will be described. Thus, the following text will describe the manner in which a station prearranged for "regular" incoming and outgoing PBX calling service may, at the PBX attendant's direction and under control of the attendant's console, be restricted to "outgoing calls only" service, which, for illustrative purposes, we shall assume to be class of service 11. In the embodiment, class of service 10 has been selected arbitrarily to represent the "normal " or "regular" calling service, while class of services 12 and 13 have been selected as representing "local calling only" and "intercom only" treatments, respectively. However, as will be more apparent from that which is contained hereinafter, each station may be wired for as many class of service codes as desired and different codes may be assigned to each station.

1.1 CLASS OF SERVICE CHANGE

Referring now to FIG. 1, when an attendant at console C1 desires to change the class of service treatment of a station assigned to the same PBX group as the console, such as station S1, a linkage path is established via busy verification trunk 7 and the switching network to the T and R leads, appearance A, of line L1 associated with station S1. Upon establishment of the connection from the console to the line L1, the attendant transmits the number of the desired class of service to the auxiliary circuit, such as auxiliary circuit 12, associated with line L1. Upon receipt of this number, the auxiliary circuit, in the manner to be more fully detailed hereinafter, releases the previously established class of service cross-connection and establishes a new cross-connection corresponding to the class of service associated with the received information, which, for illustrative purposes, has been assumed to be class of service 11.

As noted earlier, the marker 8 is arranged to establish connections involving a station only in accordance with the class of service assigned to that station. Accordingly, since class of service 11 represents "outgoing calls only," connections involving station S1 will be completed only if they originate therefrom. Accordingly, incoming calls to station S1 will not be completed while class of service 11 remains in effect.

1.2 INTERROGATION OF THE AUXILIARY CIRCUIT

We shall assume at this point that the attendant at console C1 desires to ascertain the class of service treatment currently provided on a specific station, such as station S1. For this purpose, the attendant establishes a linkage connection to the auxiliary circuit 12 associated with station S1 and, in the manner to be more fully disclosed hereinafter, applies an interrogation signal thereto. The auxiliary circuit responds to this signal by transmitting to the console the number of the currently effective class of service. This number is received by the console and translated into a visual indication of the class of service currently provided on station S1.

2.00 DETAILED DESCRIPTION

The following text will describe the embodiment of the invention in detail with reference to FIGS. 2 through 6. A cursory examination of these figures will reveal that certain contacts and relay designations have been enclosed in parentheses. The parenthetical symbol has been employed to facilitate a clear understanding of the invention by indicating that the apparatus which is enclosed therein is shown more fully in the earlier cited Busch disclosure. Relay designations and contact designations which are unique to the instant embodiment are not enclosed in parentheses and, as will be more apparent from that which is contained hereinafter, are shown in complete detail.

We shall assume, as hereinbefore set forth, that station S1 is a PBX substation having four selectable class of service treatments associated therewith. As discussed previously, these class of service (CS) treatments are CS10, "regular"; CS11, "outgoing calls only"; CS12, "local calling only"; and CS13, "intercom only." In addition, each of the foregoing class of service treatments will be arbitrarily assigned a one-digit number, 0 through 3, respectively, the purpose of which will be apparent from that which is contained hereinafter. We shall further assume that CS10, "regular" service, is currently in effect on station S1.

Prior to commencing the detailed description, it is believed that a discussion of the precise manner in which the marker ascertains the customer group number and the class of service of a calling station will facilitate a more complete understanding of applicant's invention.

Accordingly, upon an off-hook condition of the subset at station S1, marker circuit 8 is seized by line link marker connector 9 in a manner identical to that set forth in detail in the earlier cited Busch patent. Since marker circuit 8 is seized by line link marker connector 9 only in conjunction with a dial tone request, marker circuit 8 prepares to obtain that information necessary for the completion of a dial tone connection.

Referring now to FIG. 1, as detailed in the Busch patent, line link marker connector 9 extends various line location information leads to marker circuit 8 to permit registration of the information which identifies the location of the calling line. Accordingly, relays in marker circuit 8 operate to record the line link location of the calling station. In addition to the line link information, the vertical group and horizontal group locations of the calling stations are communicated to marker circuit 8.

As set forth in the Busch patent, and as detailed for a central office PBX system in U.S. Pat. No. 3,253,088 issued to D. R. Fisher, dated May 24, 1966, upon receiving the aforesaid information, marker circuit 8 seizes line link frame 2 and those leads necessary to provide the vertical file location information of the calling station are cut through from the line link frame to the marker circuit 8. Assuming that the line L1 serving station S1 is located in vertical file O(VFO) and vertical group O(VGO), then the (VFTO) and (VGTO) relays (not shown) in the marker 8 would operate in the manner detailed in the Busch and Fisher patents.

2.1 OBTAINING CUSTOMER GROUP NUMBER

Figure 4:
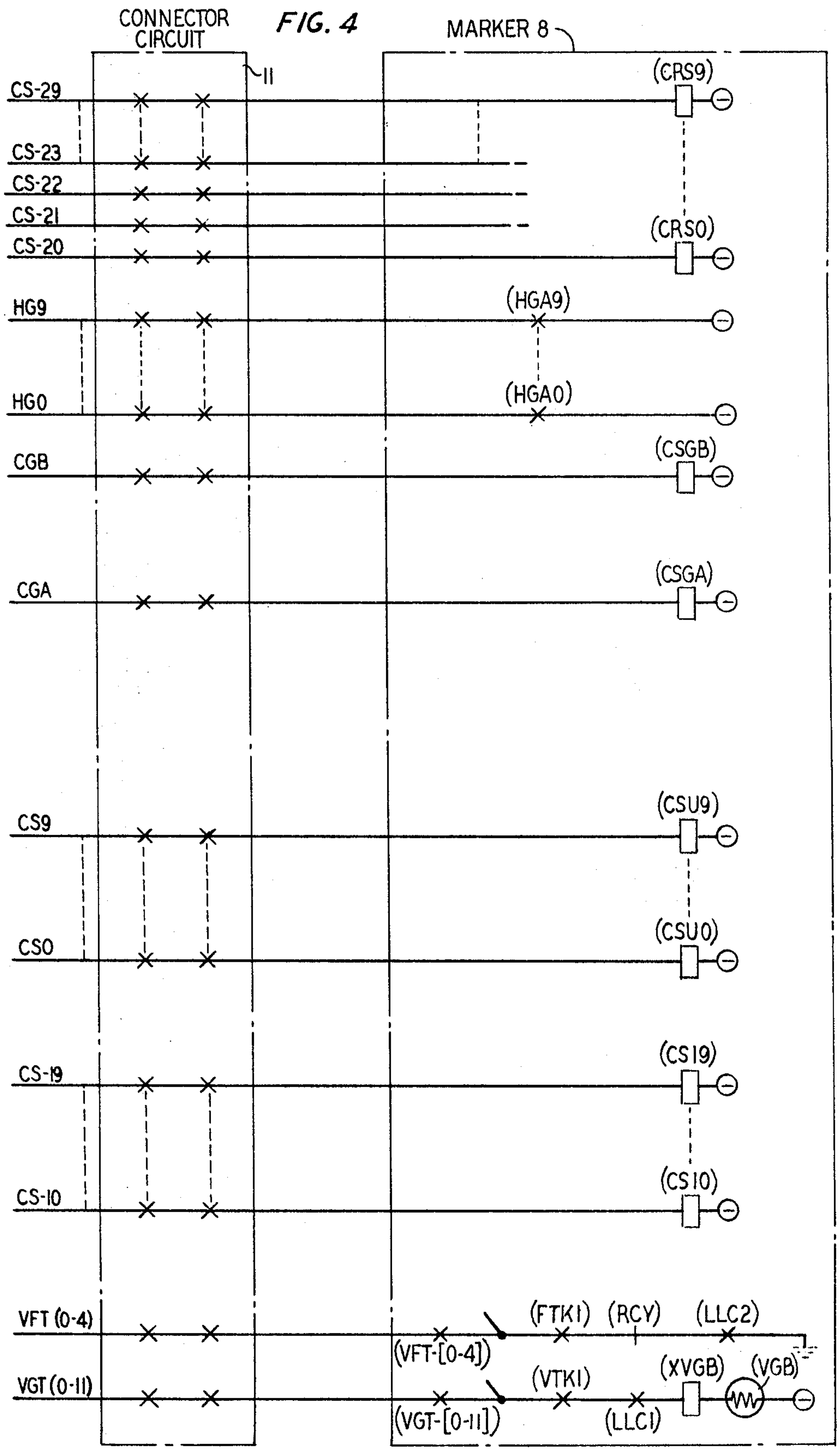

Turning now to FIGS. 3 and 4, assuming that the calling line is located on VF"O" and VG"O" as above noted, marker relay (VFTO) (winding not shown) is operated and extends over its make contact an identifying ground to lead 301 (VFT–O) made available over make contacts of relays (FTK1) and (LLC2) and a break contact of relay (RCY) to the line link frame. Operation of marker 8 relay (VGTO) extends operating battery over lead VGTO made available over make contacts of relays (VTK1), (LLC1), relay winding (XVGB) and resistor (VGB) to the winding of relay (VGBOO) FIG. 3. Relay (VGBOO) operating extends the identifying ground from lead 301 to punchings VUO–O, VTO–O, VRGO–O, and VRO–O. These punchings, with the exception of punchings VRO–O, are respectively cross-connected to the punchings associated with leads CS19, CS9, and CGB. Of the prementioned leads, the group of leads CSO through CS19 are utilized by the marker to determine the customer group in which the calling line belongs, which in the illustrative example is customer group 99. Accordingly, relays (CSU9) and (CS19) in marker 8 operate at this time, the purpose of which operation will be more apparent from that which is contained hereinafter.

Deviating momentarily it will be noted that leads CGA and CGB and the group of leads CS20 through CS29 are utilized by marker 8 to determine the class of service treatment of the associated line. Relays (CSGA) and (CSGB) in marker 8 operate from ground on either lead CGA or CGB, respectively, as an indication of the proper "tens" digit in the class of service number. Relay (CSGA) represents the tens digit "0" while relay (CSGB) represents the tens digit "1." The "units" digit of the class of service number is provided by operation of one of the relays out of the group of relays (CRSO) to (CRS9). As an example, ground on the CGB and CS29 leads from the class of service cross-connect field would enable the operation of marker 8 relays (CSGB) and (CRS9), respectively, thereby indicating that class of service 19 is associated with the station being served by the marker.

2.2 INDIVIDUAL STATION CLASS OF SERVICE DETERMINATION

Returning now to FIGS. 3 and 4, as set forth previously, identifying ground from lead 301 is extended via punching VRGO–O to punching CGB, thereby enabling the tens digit "1" relay (CSGB) in marker 8. Concurrently therewith identifying ground is extended via the operated make contact (VGBOO–11) to punching VRO–O. In the situation where all of the stations associated with one vertical file have the same class of service, such as is the case in PBX operation when the variable class of service feature is not provided, the VRO–O to VR4–11 punchings are cross-connected directly to the punchings CS20 to CS29 so as to provide the class of service treatment associated with that vertical. However, when it is desired to provide individual class of service treatments for each line, as in the instant embodiment, it is necessary to expand the cross-connection field to include horizontal groupings. This expansion is accomplished by connecting each of the punchings VR0–0 to VR4–11 associated with each vertical to expansion relays 3AA through 3AL and 3EA through 3EL.

As set forth previously, we have assumed that station S1 is associated with horizontal group "0." Accordingly relay (HGAO) (not shown) in marker 8 is operated and provides an operating battery for relay 3HGO, which relay corresponds to the horizontal associated with the station S1. The identifying ground present on lead 301 is also extended via punching VR0–0 to enable relay 3AA.

Turning now to FIG. 2, identifying ground is extended over lead 301 and via enabled make contacts 3HGO–1 and 3AA–1 and punching HGO–1 to input S1 of auxiliary circuit 12 and through the auxiliary circuit to output S1–0 via released break contacts 5B–1 and 5A–1. Auxiliary circuit 12 output S1–0 is cross-connected to punching CS20, thereby enabling the operation of relay (CRSO) in marker 8 in the manner set forth previously. Accordingly marker 8 relays (CSGB) and (CRSO)

are operated at this time to provide the marker with class of service 10, which as discussed previously, we have assumed to correspond to "normal" service.

It should be noted at this point that punching HGO–1 would be cross-connected directly to punching CS20 when individual line class of service treatments are necessary but when the remotely controllable features in accordance with my invention are not provided.

Summarizing briefly, in response to the off-hook condition of the subset at station S1, leads are extended to marker 8 via the LLMC–9, which leads provide the calling line equipment information necessary for completing connections involving that station. Included in this information are the class of service treatment and the customer group of the calling line, which, in the illustrative example, are CS10 and CG99, respectively. Upon receipt of this information, the marker proceeds to establish calling connections in the manner detailed in the aforementioned Busch or Fisher patents.

2.3 CLASS OF SERVICE CHANGE

Figure 5:
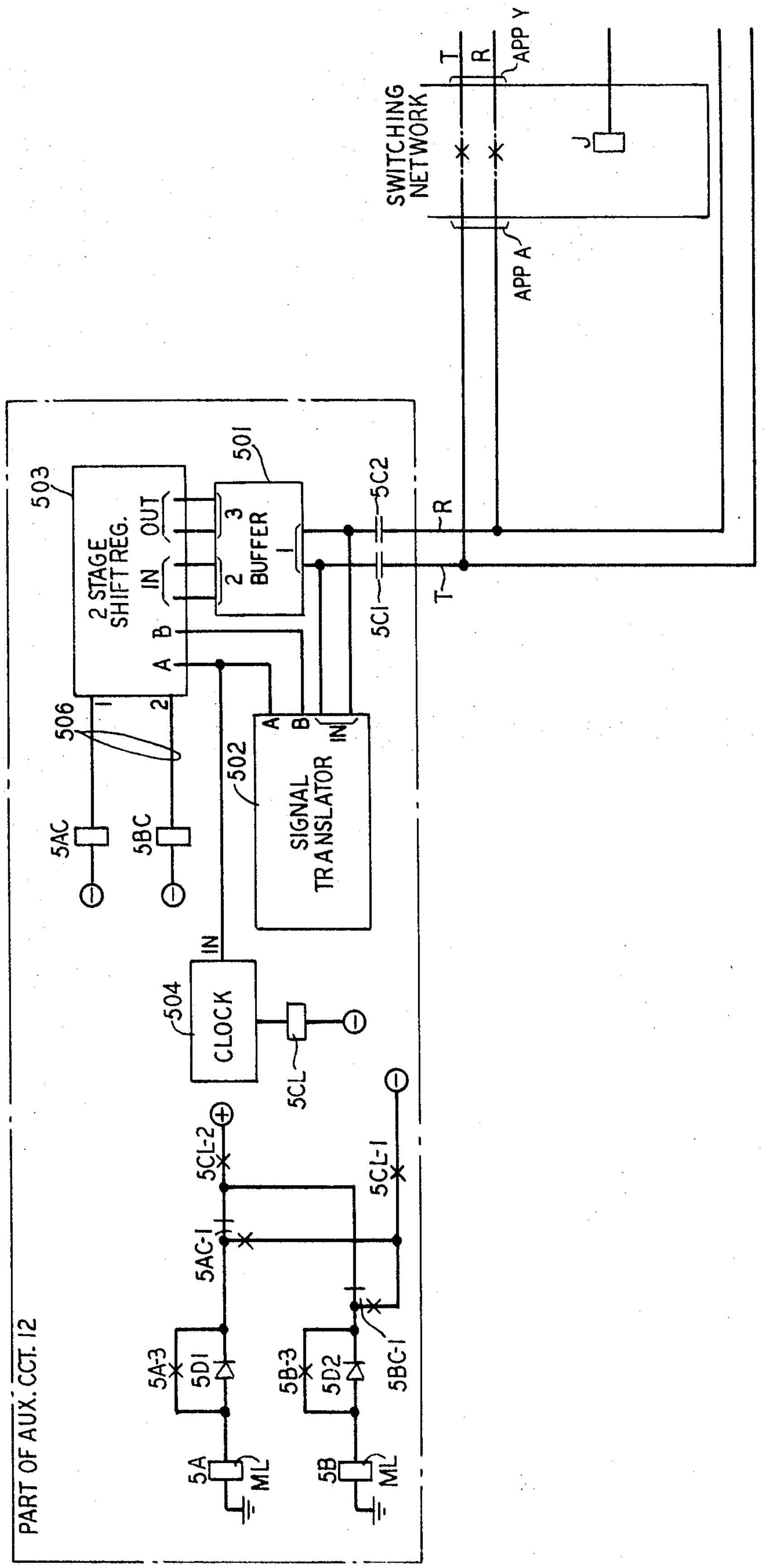
Figures 6, 7, 8:
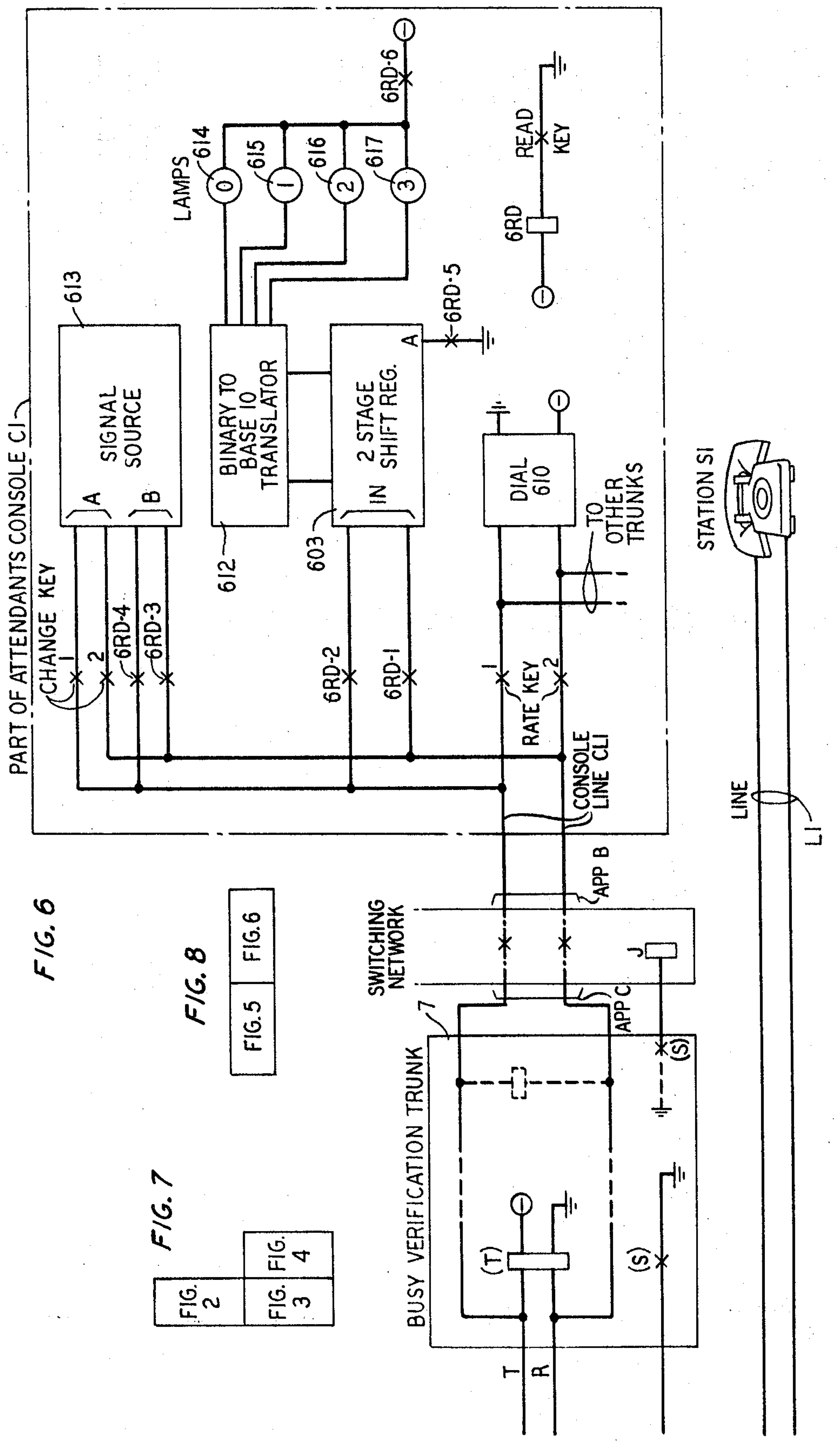
FIGS. 7 and 8 show the manner in which the other figures should be arranged.

Turning now to FIGS. 5 and 6, when an attendant at console C1 desires to change the class of service associated with a station, such as station S1, the RATE key at console C1 is operated, thereby establishing a connection via console line 1 (CL1) to originating register 6. The attendant next dials or key pulses, via dial 610, the station directory number associated with station S1. Busy verification trunk 7 operates, in the manner fully detailed in the above-mentioned Michalopoulos patent, to enable connections between attendant consoles serving a group of stations and the line appearance of any line within that group. The customer group number of the console line CL1 is matched against the customer group number, obtained in the manner previously detailed, of the desired station. Connections are established only when these numbers match so as to prevent consoles in one customer group from interfering with stations in some other group.

Busy verification trunk 7, in cooperation with other elements of the switching network as detailed in the Michalopoulos patent, enables the establishment of a connection from the attendant console C1 through the switching network and over the T and R leads to the auxiliary circuit 12 associated with station S1. The attendant at console C1 thereupon operates the CHANGE key thereby applying output A of signal source 613, which may be any one of the circuit configurations well known in the art operable to provide preset signals on each of two pairs of leads connected thereto, via the enabled CHANGE key contacts to console line CL1. Signal A is thereby transmitted over the established linkage connection to auxiliary circuit 12 and via capacitors 5C1 and 5C2 to the input of signal translator 502. Signal translator 502 may be any one of the well-known circuit configurations operable to provide a ground on output lead A when one signal is present on the input leads and ground on output lead B when another signal is present on the input leads. Upon receipt of signal A from signal source 613 signal translator 502 provides a ground to input A of shift register 503, which register may be any one of the circuit configurations well known in the art operable in response to ground on the A lead to release all information stored therein and to thereupon serially record digital data received over a pair of input leads. Register 503 is further arranged to provide grounds representative of the stored data, in binary form, to a pair of leads connected respectively to the first and second stages of the register.

The attendant at console C1 thereupon dials, via dial 610, the digits corresponding to the desired class of service, which as previously set forth we have assumed to be digit "1." The pulses representing digit "1" are transmitted via the enabled make contacts of the RATE key and over the previously established linkage path to the T and R leads of auxiliary circuit 12 and via capacitors 5C1 and 5C2 to buffer 501, which may be any one of the circuit configurations well known in the art operable to transfer signals from a first pair of leads to a second pair of leads or alternatively to transfer signals from a third pair of leads to the first pair of leads without signal interference from the leads unused at any given time. Accordingly the pulses representative of the number "1" are transmitted through buffer 501 from input 1 to output 2 and to the input of the shift register 502. These pulses are recorded in the shift register in the well-known binary format such that the first stage of the shift register is active and the second stage is inactive, thereby recording the transmitted digit "1." Accordingly, as set forth previously, ground is present only on shift register output lead 1 thereby enabling relay 5AC. Relay 5BC remains normal at this time. The purpose for the operation or release of these relays at this time will be more apparent from that which is contained hereinafter.

Digressing momentarily, it should be noted that although a two-stage shift register is utilized in the embodiment any type of register device, containing any number of stages, may be employed advantageously to store the transmitted class of service number code.

Returning now to FIG. 5, signal translator 502, at the same time ground was applied to the A lead of shift register 503, applied ground to the input of clock 504, which may be any one of the circuit configurations well known in the art operable to provide a ground at the output a certain interval after ground is applied to the input and to maintain ground at the output for a predetermined interval. Accordingly, after the delay interval clock 504 enables relay 5CL in an obvious manner. The enabling of relay 5CL provides negative operating potential for magnetic latching relay 5A via enabled make contacts 5CL–1 and 5AC–1, forward-biased diode 5D1 to the winding of the relay. Since the 5BC relay is unoperated at this time, as previously set forth, the enabling battery is not provided to relay 5B due to the normal condition of make contact 5BC–1. Upon the release of relay 5CL, after a preset interval, the enabling battery is removed and the operated ones of the magnetic latching relays 5A and 5B remain operated. Accordingly, the operated ones of the group of relays 5A and 5B now correspond to operated stages of the shift register 502.

It should be noted at this point that had relay 5B been operated prior to the operation of relay 5CL, positive releasing potential would have been extended via enabled make contact 5CL–2, released break contact 5BC–1 and enabled make contact 5B–3 to the winding of the 5B relay thereby demagnetizing the 5B relay which would cause the relay to release. In the situation where relay 5B had been released prior to the operation of relay 5CL, positive potential via enabled make contact 5CL–2 and released break contact 5BC–1 would back bias diode 502 thereby preventing the operation of relay 5B from positive potential. Accordingly the nonselected ones of the group of magnetic latching relays are released automatically upon selection of a new class of service code, with release potential only being applied to the nonselected previously operated ones of the relays.

Turning now to FIG. 2, it will be recalled that enabling ground on cable 301 was provided via punching HG0–1 and through the auxiliary circuit 12 to class of service punching CS20 upon interrogation by marker 8. When the call transfer feature has been activated, ground on output lead S1–0 of auxiliary circuit 12 is removed therefrom and transferred to output lead S1–1 via now enabled transfer contact 5—1. Accordingly whenever marker 8 interrogates station S1 for a class of service punching CS21, thereby enabling relay (CRS1) in marker 8, FIG. 4 in the manner set forth previously. Accordingly, until such time as the attendant at console C1 changes the class of service associated with station S1, class of service 11, which we have assumed to be "outgoing calls only," will be available to station S1.

Examination of FIG. 2 will show that in the event relay 5B only were operated, which would represent the transmission of the digit 2 from attendant's console C1, ground would be provided via the auxiliary circuit 12 to class of service punching 22 thereby enabling class of service 12, which we have assumed to be "local calling only." In the event both relays 5A and 5B were enabled, representing the transmission of the digit 3 from attendant's console C1, ground would be provided via the auxiliary circuit 12 to class of service punching 23 thereby enabling class of service 13, representing "intercom only," service. Accordingly, the service treatment effective on any line is controlled by the operational state of the magnetic latching relays 5A and 5B which relays are controlled in turn by data received from a remote source.

Summarizing briefly, the attendant at console C1, upon operation of the RATE key thereat, established a linkage connection to the auxiliary circuit associated with a selected station. An enabling signal was transmitted over the established connection which activated a digit register in the auxiliary circuit and the attendant thereupon transmitted, via dial 610, the code number associated with the desired class of service. Upon receipt of this number, the auxiliary circuit rearranged a group of magnetic latching relays in accordance with the received data. Accordingly, contacts of the magnetic latching relays were operated or released such that the class of service cross-connect patch field could provide the desired class of service to any interrogating manner, which class of service will remain in effect until affirmatively charged from the console.

2.4 CLASS OF SERVICE INTERROGATION

Referring again to FIGS. 5 and 6, when an attendant at console C1 desires to ascertain the class of service currently enabled on any station, such as station S1, the RATE key on console C1 is enabled and a linkage connection established from the console to the auxiliary circuit 12 associated with station S1 in the manner set forth previously. The attendant thereupon enables the READ key which provides a ground for the operation of relay 6RD. Accordingly, output B or signal source 613 is connected to the established link via enabled make contacts 6RD–3 and 6RD–4 and the signal associated therewith is transmitted to signal translator 502 of auxiliary circuit 12 over the established linkage connection.

Upon receipt of signal B signal translator 502 provides a ground on input B of shift register 503 which thereupon is enabled in the well-known manner to outpulse, in nondestructive serial fashion, the information stored therein via the buffer 501 and over the linkage connection to the console C1. This information is transmitted via enabled make contacts 6RD–1 and 6RD–2 to shift register 603 which may be any one of the circuit configurations well known in the art operable in response to ground on the A lead to release all information stored therein and to thereupon serially record digital data received over a pair of input leads and is further arranged to provide grounds representative of the stored data in binary form to a pair of leads connected respectively to the first and second stages of the register. Accordingly, upon storage of the transmitted date, shift register 603 provides the received data in binary form to translator 612, which may be any one of the circuit configurations well known in the art operable to translate binary numbers to base ten numbers and to provide grounds at the output thereat representative of the translated number. Accordingly, ground is provided to the "1" lamp 615 thereby illuminating that lamp via battery on enabled make contacts 6RD–6. The attendant thereupon is given a visual indication of the class of service treatment currently effective on station S1 until affirmatively changed in the manner set forth previously.

It should be noted that although the shift register 502 of FIG. 5 is utilized to outpulse the currently effective class of service information, numerous other arrangements may be employed to provide this information to the console. For example, it could be equally effective to arrange the auxiliary circuit 12 to interrogate the windings of the magnetic relays directly to obtain their operational status.

CONCLUSION

While the equipment of this invention has been shown in a particular embodiment wherein an attendant, after gaining access to an auxiliary circuit associated with a selected station, transmits thereto digital information corresponding to a particular class of service treatment or interrogates the auxiliary circuit to determine which class of service treatment is currently effective thereon, it is to be understood that such an embodiment is intended only to be illustrative of the present invention and numerous other arrangements may be devised by those skilled in the art without departing from the spirit and scope of the invention.

For example, incoming connection restrictions which are completed in accordance with cross-connections on a number group frame may be controlled by an attendant by associating an auxiliary circuit, such as auxiliary circuit 12, with the number group cross-connection field in the same manner as shown herein for the class of service cross-connection field.

In addition, any restriction, either incoming or outgoing, may be placed on many lines concurrently from an attendant's console by providing a dialing code which enables concurrent connections to all the auxiliary circuits associated with selected groups of stations.

What I claim is:

1. In a communication system a station,
means including a wired cross-connection field for defining a plurality of class or service designations for said station, to one of which designations said station is normally assigned,
an attendant's console,
switching means controlled by the particular station class of service designation assigned for completing connections involving said station, said assigned designation being provided to said switching means upon interrogation of said wired cross-connection field,
means including relay means individual to said station and controllable from said attendant's console for inhibiting said normally assigned class of service designation and for selectively assigning a different one of said plurality of class of service designations to said station.

2. The invention as set forth in claim 1 further comprising
means individual to said station and controllable from said attendant's console for interrogating said station so as to obtain the class of service designation currently assigned thereto, and
means at said console for displaying said designation.

3. In a telephone switching system
a switching network,
a plurality of stations each having a line appearance in said network,
a cross-connection field for associating a class of service with each of said line appearances,
a plurality of consoles,
means for selectively establishing connections between one of said consoles and one of said line appearances, and
means individual to said one line appearance and selectively responsive to signals received over said connections from said one console for controlling said cross-connection field to change the class of service associated with said one line appearance.

4. The invention as set forth in claim 3 wherein said cross-connection controlling means further comprises
means selectively responsive to signals from said one console for transmitting information to said one console corresponding to said currently associated class of service.

5. The invention as set forth in claim 3
wherein said selectively responsive cross-connection controlling means further comprises
a plurality of relays the contacts of which are operable to interrupt the class of service associated with said line appearance and to substitute a different class of service therefor and
means for enabling selected ones of said relays while concurrently releasing unselected ones of said relays.

6. The invention as set forth in claim 3
wherein said consoles each comprise
means for transmitting a plurality of unique signals,
means for serially receiving digital data, and means for transmitting digital data to a connected station, and wherein said selectively responsive cross-connection controlling means further comprises a plurality of relays the contacts of which are operable to interrupt the class of service associated with said line appearance and to substitute a different class of service therefor, a register operable upon one signal from said connected console for serially storing digital data received from said console and operable upon another signal from said connected console for transmitting thereto digital data stored in said register and means responsive to receipt of said one signal from said connected console for releasing and enabling said relays in accordance with data stored in said register.

7. The invention as set forth in claim 6 wherein said cross-connection controlling means further comprises means responsive to receipt of said another signal from said connected console for transmitting said stored digital data to said console data receiving means.

8. An auxiliary circuit for providing a plurality of class of service treatments on a line in a communication switching system having call completion means operable to establish connections involving said line in accordance with an enabled one of said class of service treatments and wherein unique signals and data corresponding to a selected one of said class of service treatments are transmitted over said line;

said auxiliary circuit comprising means for detecting the transmission of a first unique signal, means enabled by said detecting means for storing any of said transmitted data, and means concurrently responsive to the enabling of said detecting means and to storage of said data for enabling the class of service treatment corresponding to said data.

9. The invention as set forth in claim 8 wherein said class of service information is ascertained by said call completion means by interrogation of a cross-connection field and wherein said class of service treatment enabling means further comprises relay means operable in response to changes in said stored data for changing the cross-connection field in accordance with the changed data.

10. The invention as set forth in claim 8 wherein said auxiliary circuit further comprises means for detecting the transmission of a second unique signal, and means enabled by said second signal detecting means for transmitting over said line data from said storage means corresponding to said enabled class of service treatment.

11. The invention as set forth in claim 8 wherein said storage means comprises a multistage counter wherein said stored date is represented by active and nonactive stages, and said class of service-enabling means further comprises a plurality of latching relays each associated with a unique one of said counter stages, means for momentarily applying operating potential to the relays associated with active stages of said counter, and means for momentarily applying releasing potential to operated ones of said relays associated with nonactive stages of said counter.

12. An automatic telephone exchange system for providing private branch exchange service to private branch exchange lines comprising a plurality of lines, a wired cross-connection field associated with said lines for providing class of service information on each of said lines, a marker responsive to connections involving any one of said lines for obtaining from said wired cross-connection field of the class of service information assigned to said line, and auxiliary circuits individually associated with certain of each lines each comprising means for storing data transmitted over a connection involving said associated line and relay means enabled upon receipt of said data for changing the class of service information contained in said cross-connection field associated with said line.

13. The invention as set forth in claim 12 further comprising a console and means including said marker means for establishing connections from said console to selected ones of said lines, and wherein each of said auxiliary circuits further comprises means for transmitting stored data over a connection involving said associated line and said console.